(12) United States Patent
Richard

(10) Patent No.: US 8,322,685 B1
(45) Date of Patent: Dec. 4, 2012

(54) NON-COLLINEAR VALVE ACTUATOR

(75) Inventor: James A. Richard, Grant, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 253 days.

(21) Appl. No.: 12/842,218

(22) Filed: Jul. 23, 2010

(51) Int. Cl.
*F01B 9/00* (2006.01)
*F16K 31/12* (2006.01)
*F16K 31/44* (2006.01)

(52) U.S. Cl. ............ 251/279; 92/140; 251/58; 251/243

(58) Field of Classification Search ............... 92/130 B, 92/130 D, 130 R, 138, 140; 251/58, 62, 242, 251/243, 279
See application file for complete search history.

(56) References Cited

U.S. PATENT DOCUMENTS

| | | | | |
|---|---|---|---|---|
| 1,685,582 A * | 9/1928 | Whitten | ......................... | 251/229 |
| 2,557,982 A * | 6/1951 | Lewis | ............................. | 60/596 |
| 2,739,679 A * | 3/1956 | Randol | .......................... | 477/174 |
| 3,053,242 A * | 9/1962 | Arpaia | .......................... | 123/332 |
| 3,626,919 A * | 12/1971 | MacMillan | ............ | 123/198 DB |
| 3,684,237 A | 8/1972 | Hyde et al. | | |
| 4,050,670 A | 9/1977 | Borg et al. | | |
| 4,586,502 A | 5/1986 | Bedi et al. | | |
| 5,354,234 A * | 10/1994 | Arold et al. | ..................... | 454/69 |
| 6,086,040 A | 7/2000 | Peterson | | |
| 7,370,615 B2 | 5/2008 | Lou | | |

* cited by examiner

*Primary Examiner* — John K Fristoe, Jr.
*Assistant Examiner* — Frederick D Soski
(74) *Attorney, Agent, or Firm* — Edward Kiessling, IV; Jerry L. Seemann

(57) ABSTRACT

A non-collinear valve actuator includes a primary actuating system and a return spring system with each applying forces to a linkage system in order to regulate the flow of a quarter-turn valve. The primary actuating system and return spring system are positioned non-collinearly, which simply means the primary actuating system and return spring system are not in line with each other. By positioning the primary actuating system and return spring system in this manner, the primary actuating system can undergo a larger stroke while the return spring system experiences significantly less displacement. This allows the length of the return spring to be reduced due to the minimization of displacement thereby reducing the weight of the return spring system. By allowing the primary actuating system to undergo longer strokes, the weight of the primary actuating system may also be reduced. Accordingly, the weight of the non-collinear valve actuator is reduced.

4 Claims, 3 Drawing Sheets

NON-COLLINEAR VALVE ACTUATOR

The invention described herein was made by an employee of the United States Government and may be manufactured and used by or for the Government of the United States of America for governmental purposes without the payment of any royalties.

BACKGROUND OF THE INVENTION

1. Field of the Invention

This invention relates to a valve actuator for regulating the flow of a quarter-turn valve. More specifically, the invention is a valve actuator which departs from the prior art by placing a primary actuating system and a return spring system in a non-collinear manner relative to each other, meaning the primary actuating system and return spring system are no longer exclusively in line with each other.

2. Description of the Related Art

In the past, valve actuators employing a pressure-actuated piston and return spring system placed both systems exclusively in line with one another. As a result, the length of the piston's stroke and displacement of the return spring had a one-to-one correspondence. In other words, a displacement of four inches in the pressure-actuated piston corresponded to four inches of compression in the return spring. Therefore, the weight of return spring systems in valve actuators employing this design remained dependent on the displacement of the pressure actuated piston due to the linear relationship between the two systems. Accordingly, the need to reduce the mass of valve actuators for flight systems resulted in the non-collinear valve actuator.

SUMMARY OF THE INVENTION

The primary objective of the present invention is to provide an actuator with an optimal weight for regulating the flow of a quarter-turn valve.

Another objective of the present invention is to reduce the weight of the primary actuating system by reducing the wall thickness of the primary actuating system's pressure cylinder by allowing the primary actuating system to undergo longer strokes.

Another objective of the present invention is to reduce the weight of the return spring system by minimizing the displacement of the return spring which inherently allows for a shorter spring length thereby optimizing the weight of the return spring.

Still another objective of the present invention is to deviate from the 1:1 relationship between the displacement of the primary actuating system and compression of the return spring system.

Other objects and advantages of the present invention will become more obvious hereinafter in the specification and drawings.

The novel non-collinear aspect of this particular valve actuator lies in the placement of two force producing components: the primary actuating system and the return spring system. More specifically, the primary actuating system and the return spring system act on different points of a rotably affixed transmission link, which is one component of a linkage system responsible for opening and closing a quarter-turn valve. Having the primary actuating system apply force on the transmission link at a greater radial distance from the rotably affixed end of the transmission link in comparison to the return spring system allows the primary actuating system to have a longer stroke length with minimal displacement of the return spring. By allowing the primary actuating system to undergo longer strokes, the weight of the primary actuating system may be optimized. Furthermore, positioning these two components non-collinearly allows for optimization of the spring's length by minimizing its displacement which inherently leads to a reduction in the weight of the return spring system and ultimately the weight of the valve actuator thereby achieving the aforementioned objectives.

DESCRIPTION OF THE PREFERRED EMBODIMENT

In the ensuing description, the novel elements of a non-collinear valve actuator will be set forth without focusing on particular construction details as such construction details are considered to be understood in the art. Furthermore, these novel elements may be implemented in a variety of applications without departing from the scope of the present invention.

Figure 1:
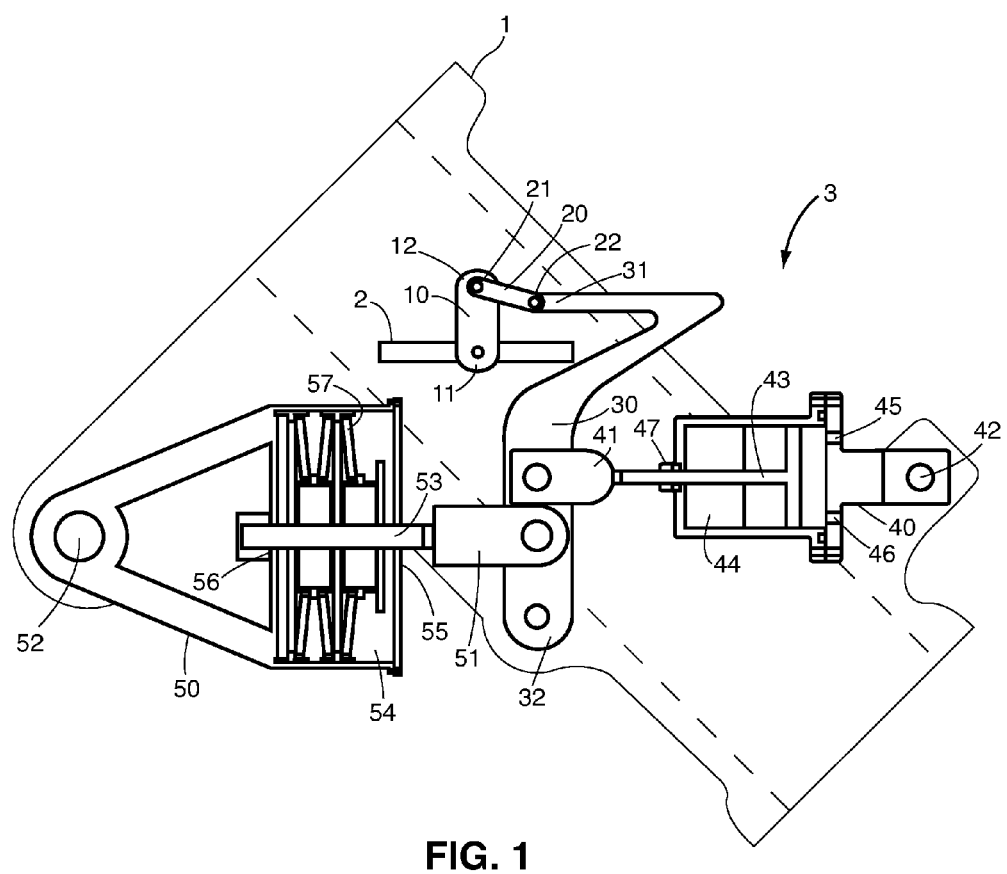
FIG. 1 is a cross-sectional view of a non-collinear valve actuator in accordance with an embodiment of the present invention.

Referring to FIG. 1, a quarter-turn valve is shown having a frame or valve body (1), a flow regulator (2), and a non-collinear valve actuator (3). The non-collinear valve actuator (3) comprises a valve lever (10), a drag link (20), a transmission link (30), a primary actuating system (40), and a return spring system (50). The valve lever (10) has a first end (11) and a second end (12). The first end (11) is attached to and extends from the flow regulator (2) and is pivotally constrained to the valve body (1). The second end (12) is movably affixed to the drag link (20). The drag link (20) has a first end (21) and a second end (22). The first end (21) of the drag link (20) attaches to the second end (12) of the valve lever (10). The second end (22) of the drag link (20) is movably affixed to the transmission link (30). The transmission link has a first end (31) and a second end (32). The first end (31) of the transmission link (30) attaches to the second end (22) of the drag link (20). The second end (32) of the transmission link (30) is rotably affixed to the valve body (1). The primary actuating system (40) has a first end (41) and a second end (42). The first end (41) is movably affixed to the transmission link (30). The second end (42) is pivotally constrained to the valve body (1). The return spring system (50) has a first end (51) and a second end (52). The first end (51) is movably affixed to the transmission link (30) between the first end (41) of the primary actuating system (40) and the second end (32) of the transmission link (30). The second end (52) of the return spring system (50) is pivotally constrained to the valve body (1).

In the illustrated embodiment, the first end (41) of the primary actuating system (40) is attached to a piston (43) and the second end (42) of the primary actuating system (40) is attached to a cylinder (44) having an aperture (47) thereby allowing the piston (43) to translate therethrough. The cylinder (44) is further defined by an inlet port (45) and a vent port

(46) effectively allowing a pressurized fluid to enter and exit the cylinder (44), respectively. As shown, the primary actuating system (40) can be a pneumatic system or a hydraulic system. However, other methods of operation for the primary actuating system are clearly possible.

With respect to the return spring system (50), the first end (51) is attached to a rod (53) and the second end (52) is attached to a cylinder (54). The cylinder (54) has a first end (55) and a second end (56) with each end having an aperture thereby allowing the rod (53) to translate therethrough. Additionally, the cylinder (54) houses a plurality of Belleville springs (57). The Belleville springs (57) are connected to the rod (53) inside the cylinder (54) with the rod (53) capable of translating through the Belleville springs (57). Additionally, the Belleville springs (57) provide the force necessary to preload the rod (53) (and thereby ensure the valve remains in the open position when the actuator is at rest). When the valve is closed, the Belleville springs (57) are further compressed by the translation of the rod (53). That being said, the function of the return spring system (50) may be achieved with other configurations.

Figure 2:
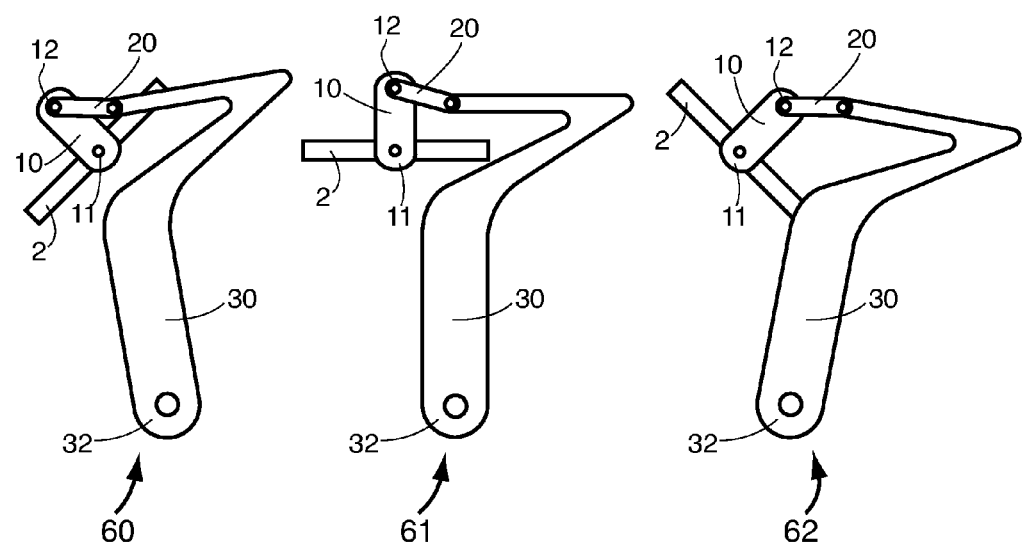
FIG. 2 is a schematic illustrating the positioning of the linkage system when the valve is in the closed (shown on left), midpoint (shown in middle), and open (shown on right) positions.

In the present embodiment, the pressurized fluid enters the cylinder (44) by way of the inlet port (45). The pressurized fluid continues to enter the cylinder (44) creating pressure on the piston (43). This pressure causes the piston (43) to rotate the transmission link (30). The drag link (20) then transfers the rotational force from the transmission link (30) into the valve lever (10) thereby causing the flow regulator (2) to close. In FIG. 2, the flow regulator (2), the valve lever (10), the drag link (20), and the transmission link (30) are depicted in the closed (60), midpoint (61), and open (62) positions. In the illustrated embodiment, the primary actuating system (40) acts to close the flow regulator (2) thereby preventing fluid flow through the valve body (1) while the return spring system (50) returns the flow regulator (2) to the open position (62). Furthermore, the non-collinear valve actuator (3) is employed on a quarter-turn valve, so the flow regulator (2) rotates 90° or a quarter of a turn from the open position (60) to the closed position (62). That being said, this particular embodiment is not meant to limit the invention. For example, the non-collinear valve actuator (3) could be configured to use the primary actuating system (40) to open (rather than close) a quarter-turn valve.

Figure 3:
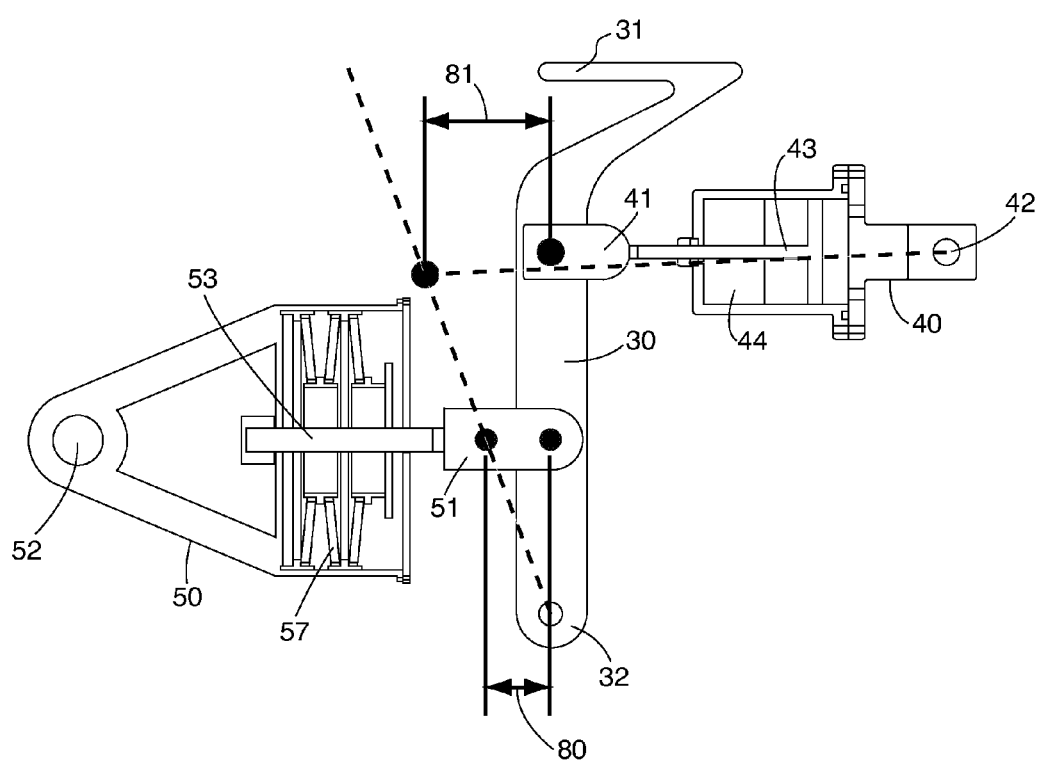
FIG. 3 is a schematic illustrating the minimization of the displacement in the return spring system resulting from the non-collinear placement of the primary actuating system relative to the return spring system.

The present invention has numerous advantages. The non-collinear placement of the primary actuating system (40) relative to the return spring system (50) allows the parameters of each to be optimized independently. As seen in FIG. 3, for a given amount of rotation of the transmission link (30), the return spring system (50) experiences significantly less displacement (80) in relation to the displacement (81) of the piston (43). More specifically, having the primary actuating system (40) applying force at a greater radial distance from the second end (32) of the transmission link (30) in comparison to the return spring (50) allows the stroke of the piston (43) to be longer without requiring an equivalent displacement in the return spring system (50). By allowing the piston (43) to undergo a longer stroke, the wall thickness of the cylinder (44) may be reduced thereby reducing the weight of the primary actuating system (40) and the non-collinear valve actuator (3). Furthermore, minimizing the displacement (80) in the return spring system (50) allows a shorter stack of Belleville springs (57) to be used. Accordingly, the return spring system (50) weighs less thereby reducing the weight of the non-collinear valve actuator (3) which as stated above is one of the primary objectives of the invention.

Although the present invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A quarter-turn valve having a valve body, a flow regulator, and a non-collinear valve actuator, wherein said non-collinear valve actuator comprises:
   (a) a valve lever having a first end and a second end with said first end attached to and extending from said flow regulator and pivotally constrained to said valve body for purposes of operating said flow regulator housed within said valve body;
   (b) a drag link having a first end and a second end with said first end movably affixed to said second end of said valve lever;
   (c) a transmission link having a first end and a second end with said first end movably affixed to said second end of said drag link and said second end of said transmission link rotably affixed to said valve body whereby said drag link can transfer rotational force of said transmission link into said valve lever;
   (d) a primary actuating system having a first end and a second end with said first end movably affixed to said transmission link and said second end pivotally constrained to said valve body; and
   (e) a return spring system having a first end and a second end with said first end movably affixed to said transmission link between said first end of said primary actuating system and said second end of said transmission link while said second end of said return spring system is pivotally constrained to said valve body.

2. The non-collinear valve actuator as set forth in claim 1, wherein said primary actuating system further comprises:
   (a) a piston attached to said first end of said primary actuating system whereby said piston may be operated pneumatically or hydraulically by a pressurized fluid; and
   (b) a cylinder attached to said second end of said primary actuating system wherein said cylinder contains an inlet port and a vent port thereby allowing said pressurized fluid to enter and exit said cylinder with said cylinder also having an aperture for purposes of allowing said piston to translate therethrough.

3. The non-collinear valve actuator as set forth in claim 1, wherein said return spring system comprises:
   (a) a rod attached to said first end of said return spring system;
   (b) a cylinder attached to said second end of said return spring system wherein said cylinder has a first end having an aperture and a second end having an aperture thereby allowing said rod to translate therethrough said cylinder; and
   (c) a plurality of Belleville springs housed within said cylinder with said plurality of Belleville springs connected to said rod for purposes of providing a force necessary to preload said rod when said primary actuating system is inactive and absorb compressive forces from said rod when said primary actuating system is active.

4. A frame having a quarter-turn regulator and a non-collinear actuator, wherein said non-collinear actuator comprises:
   (a) a lever having a first end and a second end with said first end attached to said regulator and pivotally constrained to said frame for purposes of operating said regulator;

(b) a drag link having a first end and a second end with said first end movably affixed to said second end of said lever;

(c) a transmission link having a first end and a second end with said first end movably affixed to said second end of said drag link and said second end of said transmission link rotably affixed to said frame whereby said drag link can transfer rotational force of said transmission link into said lever;

(d) a primary actuating system having a first end and a second end with said first end movably affixed to said transmission link and said second end pivotally constrained to said frame; and (e) a return spring system having a first end and a second end with said first end movably affixed to said transmission link between said first end of said primary actuating system and said second end of said transmission link while said second end said of return spring system is pivotally constrained to said frame.

* * * * *